June 15, 1926.

H. J. ANDERSON

MOUSETRAP

Filed Sept. 20, 1924   2 Sheets-Sheet 1

1,589,086

Witnesses:

Inventor:
H. J. Anderson
By H. J. Sanders
atty.

June 15, 1926.

H. J. ANDERSON

MOUSETRAP

Filed Sept. 20, 1924

WITNESS:
Gust. Hjelm

INVENTOR:
H. J. Anderson
BY H. J. Sanders
ATTORNEY.

Patented June 15, 1926.

1,589,086

UNITED STATES PATENT OFFICE.

HENRY J. ANDERSON, OF FOX PARK, WYOMING.

MOUSETRAP.

Application filed September 20, 1924. Serial No. 738,881.

This invention relates to improvements in traps and more particularly to traps designed to ensnare and destroy mice. Simplicity in construction and arrangement of parts, efficiency in operation and durability are objects attained. With the foregoing and other objects in view the invention consists in the combination and arrangement of parts to be hereinafter fully described, pointed out in the appended claim and illustrated in the accompanying drawing which forms a part of this application and in which—

Like reference characters denote corresponding parts throughout the several views.

Figure 1:
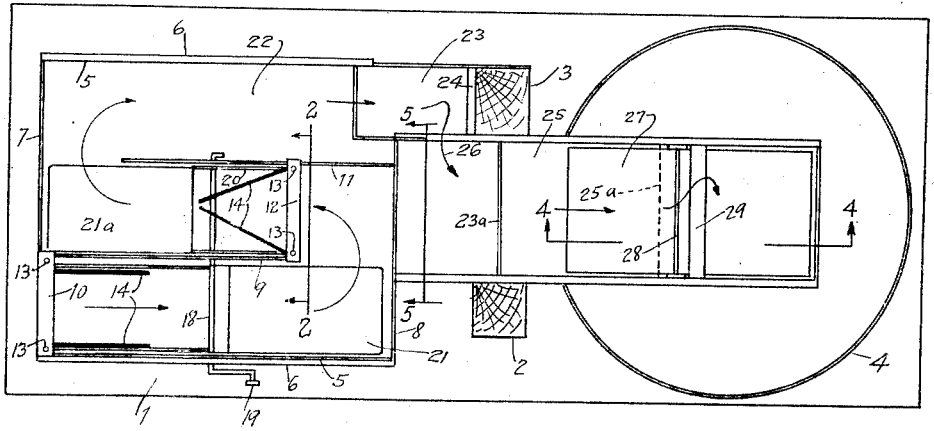
Fig. 1 is a top plan view of the trap with the compartment covers removed.
Figures 2, 3:
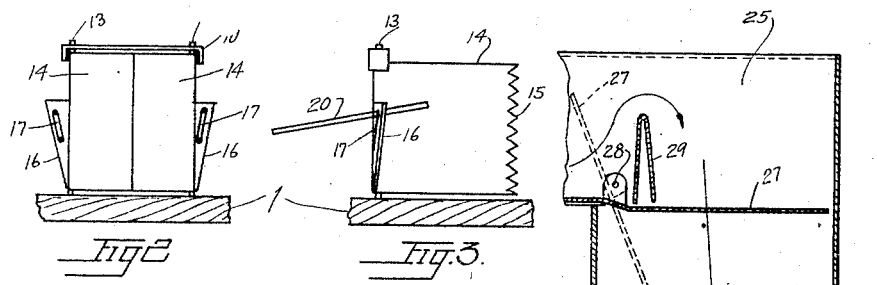
Fig. 2 is a cross sectional view taken on line 2—2 of Fig. 1.
Fig. 3 is a side view of Fig. 2.

The trap comprises a rectangular base 1 whereon the spaced uprights 2, 3 are arranged, that may be connected by suitable cross braces, and the water tank 4. A housing is also arranged upon the base 1 and comprises the side walls 5 having outwardly turned flanges 6, the front wall 7 and the rear wall 8. A cover or top (not shown) for the housing is provided merely to prevent the animals from jumping out of the housing after entering the same.

A partition 9 extends rearwardly from the front wall 7 and has its inner end spaced away from the rear wall 8, the front wall 7 being open between said partition and the adjacent side wall 5 to form an entrance, a span 10 connecting said partition 9 and adjacent side wall 5. A second partition 11 spaced away from the partition 9 extends from the rear wall 8 forward and has its inner end spaced away from the front wall 7, a span 12 connecting the inner end of the partition 9 with the partition 11.

Pintles 13 are supported upon the spans 10 and 12 and the base 1 and upon each a swinging door 14 is supported, said doors being formed along their free or meeting edges with serrations 15 and each door being provided upon its outer side with a wing 16 formed with an oblique slot 17, the slots in any pair of door wings converging downwardly toward each other. A transverse shaft 18 extends through one side wall 5, through the partitions 9 and 11 and is provided outside the housing with the handle 19 by means of which it may be manually oscillated. Fast to said shaft 18 and at right angles thereto are the rocker arms 20, arranged in pairs, one pair being upon each side of the partition 9, each pair extending through the oblique slots 17 of a pair of wings 16 and, upon the opposite side of the shaft 18 with relation to said wings, carrying a step plate 21 or 21ª.

At the end of the runway 22 formed between the partition 11 and the adjacent side wall 5 is a vertical casing 23 supported by the upright 3 and open at its lower end and a ladder 24 formed of wire mesh, or other suitable material, secured to the upright 3 extends the full length of the casing 23. Contiguous to the casing 23 and supported upon a shaft 23ª between the uprights 2, 3 and by the water tank 4 is a horizontal housing 25 provided with a removable cover 26, which type of cover may be employed on the housing 5, 7, 8; said members 23 and 25 being formed with aligned perforations at a point denoted by the arrow 26. A perforation 25ª in the end of the housing 25 located over the water tank is in alignment with a similar perforation in the top of the tank, said perforations being normally covered by one end of a trap door 27 fulcrumed upon a transverse shaft 28 connecting the sides of housing 25, said trap door being so hung that it is normally in horizontal position thus serving as a closure for the perforation 25ª. A hurdle 29 extending transversely of the housing 25 and secured to the side walls thereof is provided. It will be noted that the end of the housing 25 disposed over the water tank 4 may be raised clear of the tank to permit removal of the tank for filling or emptying the same. One housing end is raised by simply depressing the opposite end or by rocking the housing upon the shaft 23ª.

The mouse enters through the door formed by the opening in the front wall 7 beneath the span 10, a small piece of bait being preferably left upon the step plate 21, and when the mouse steps upon said step plate he rocks the rocker arms. The step plates and doors are so connected to the rocker arms that when one pair of doors is open the step plate in line therewith is in raised position with relation to the base 1 and when that pair of doors is closed the step plate in line therewith is lowered. The doors and plates are initially positioned by hand by means of the handle 19 as shown in Fig. 1. The doors 14 beneath the span 10 are open and the step plate 21 is in raised position off the base.

Figure 4:
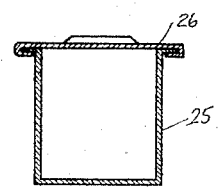
Fig. 4 is a longitudinal sectional view taken on line 4—4 of Fig. 1.
Figure 5:
Fig. 5 is a cross section on line 5—5 of Fig. 1.
Figure 6:
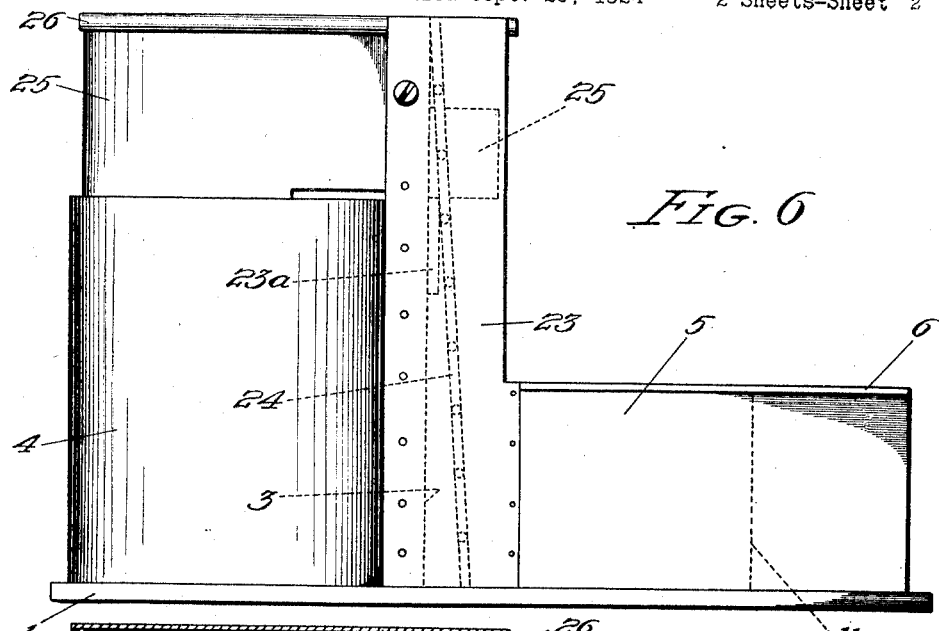
Fig. 6 is a view of the trap in side elevation.
Figure 7:
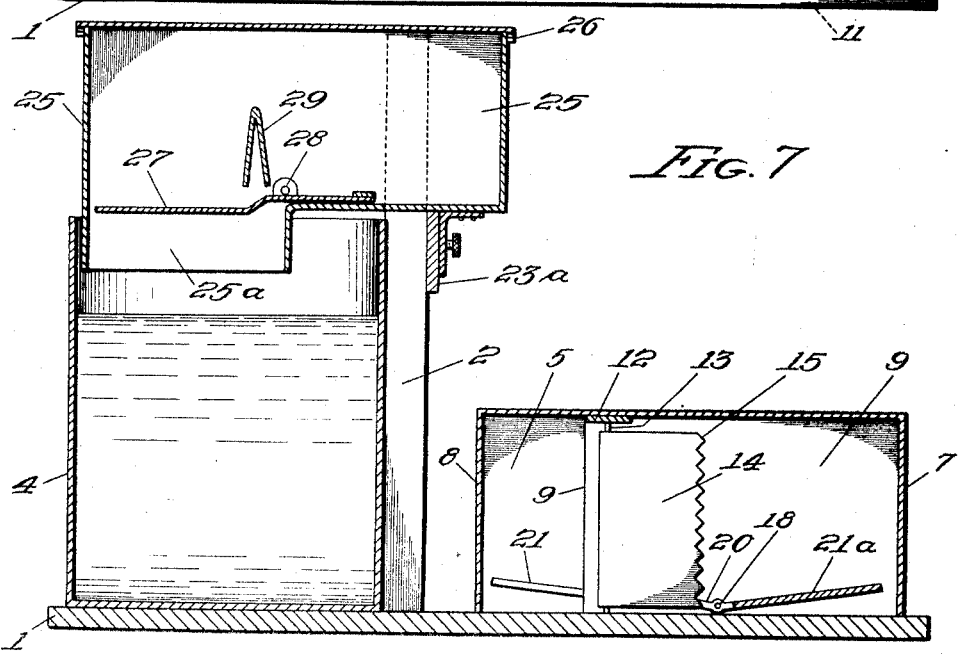
Fig. 7 is a longitudinal vertical sectional view through the trap.

The step plates are alternately raised and lowered and the two pairs of doors are alternately opened and closed to correspond therewith. The effect of the mouse entering and stepping upon step plate 21 is to close the doors 14 beneath span 10. As the mouse cannot now retrace his steps he will find his way around the inner end of the partition 9 and through the open doors 14 and upon the step plate 21ª. His weight upon this plate will depress it and close the second or inner set of doors 14. He will now find his way about the inner end of the partition 11 into the runway 22. The only possible outlet therefrom is through the vertical casing 23 by way of ladder 24 from which he will escape into the horizontal housing 25 and upon taking the hurdle 29 he will alight upon the end of the trap door 27 disposed over the opening 25ª in the housing floor and as said door moves into the position shown dotted in Fig. 4 he will be precipitated into the water in the tank 4 to drown. The tank may be removed and emptied in due course.

What is claimed is:—

In a trap, a base, a housing upon said base, inner parallel partitions for said housing, each of said partitions being of less extent than the depth of said housing, the inner ends of said partitions being adjacent opposite ends of said housing, a transverse rotary shaft connecting one wall of said housing and said partitions, rocker arms fast to said transverse shaft and arranged in pairs upon opposite sides of one of said partitions, step plates carried by said pairs of rocker arms, swinging doors arranged at opposite ends of one of said partitions and operatively connected in pairs to said pairs of rocker arms, said swinging doors being adapted to alternately open and close as said step plates are alternately raised and lowered, a vertical casing at one end of said housing, a water tank arranged upon said base, a horizontal housing connecting said casing and water tank and having perforations in alignment with perforations in said casing and tank, and a hurdle in said horizontal housing.

In testimony that I claim the foregoing as my own I have hereto affixed my signature.

HENRY J. ANDERSON.